No. 889,841. PATENTED JUNE 2, 1908.
V. G. APPLE.
DYNAMO ELECTRIC MACHINE.
APPLICATION FILED MAY 11, 1907.
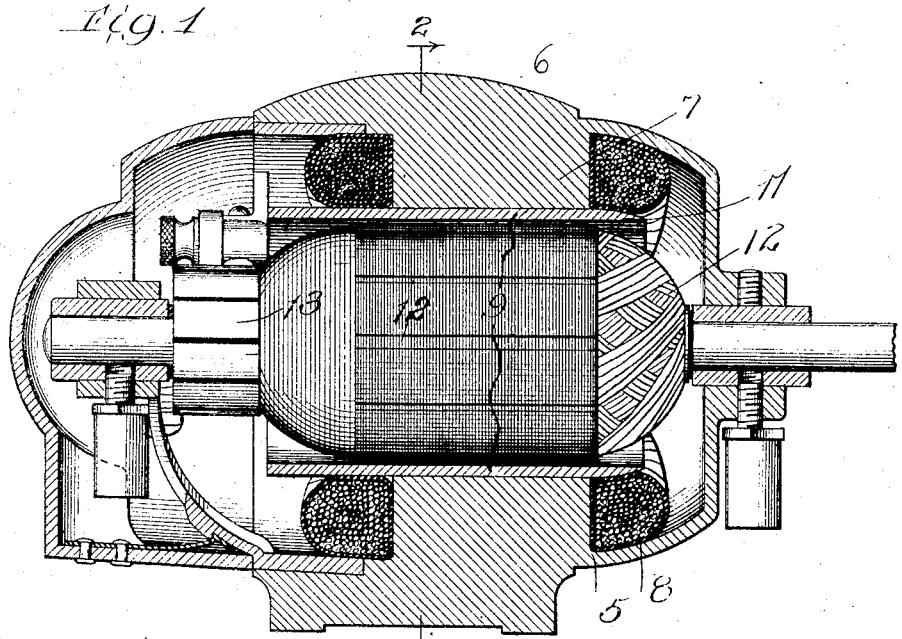
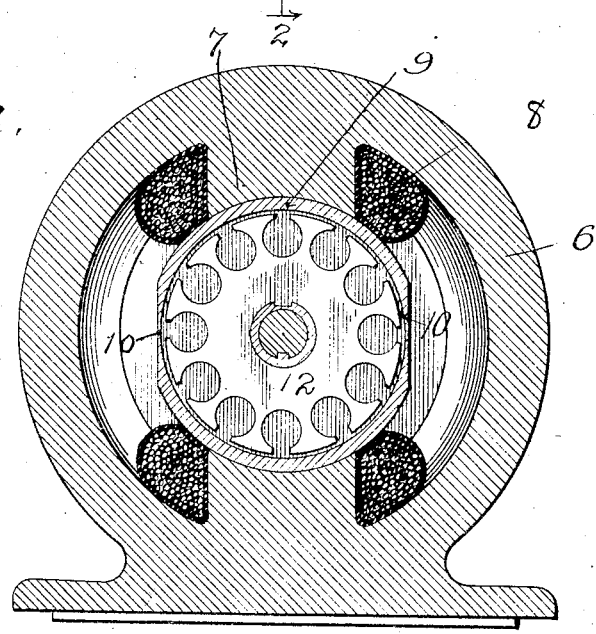

UNITED STATES PATENT OFFICE.

VINCENT G. APPLE, OF DAYTON, OHIO, ASSIGNOR TO DAYTON ELECTRICAL MANUFACTURING CO., A CORPORATION OF OHIO.

DYNAMO-ELECTRIC MACHINE.

No. 889,841.        Specification of Letters Patent.        Patented June 2, 1908.

Application filed May 11, 1907. Serial No. 373,055.

*To all whom it may concern:*

Be it known that I, VINCENT G. APPLE, a citizen of the United States, residing at Dayton, in the county of Montgomery and State of Ohio, have invented certain new and useful Improvements in Dynamo-Electric Machines, of which the following is a specification.

My invention relates to improvements in dynamo electric machines, and has for its general object to provide a dynamo electric machine involving a field pole construction which is mechanically and electrically advantageous.

I have found that in dynamo construction great advantage may be attained by providing a pole tube supported by and making magnetic contact with the pole cores, such tube providing a free, truly cylindrical, central area, in which the armature may revolve, and being attenuated to extreme thinness between the pole cores. Such construction is mechanically advantageous in that the single pole tube, which may be driven in endwise and make a driving fit with the pole cores, operates to hold in place upon the cores all of the field windings, thereby producing an extremely simple structure, easy to manufacture and readily assembled, and I have further found that such construction has many electrical advantages, certain of which are, that it results in the production of a stable field, wherein a commutation point is maintained so close to the theoretical neutral commutation point, that without change of position of the commutator brushes the machine may be run in either direction, practically without sparking. Further, since the tube presents a smooth and truly round interior surface, the clearance afforded for the armature may be made very small without danger of destruction or mutilation of the armature in the event that it should work slightly off its proper axis of rotation. Also it will be seen that the unbroken continuity of the ring causes it to tend to act as a keeper for the magnetism in the dynamo frame, so that ample residual magnetism is retained to cause the machine to build up its field quickly, and the slight short-circuiting effect of the attenuated connection between the poles tends to prevent the magnetic lines from bending back from the polar surfaces toward the frame, while the extreme attenuation at points between adjacent poles prevents the short-circuiting effect from being so marked as to be electrically harmful.

Many other objects and advantages of my invention will become apparent to those skilled in the art from the following description, taken in conjunction with the accompanying drawings, wherein:

Figure 1 is a central vertical section through a small dynamo embodying my invention; Fig. 2 is a cross section on line 2—2 of Fig. 1.

Throughout the views like numerals of reference refer always to like parts.

In the drawings I have illustrated my invention as applied to a small bi-polar dynamo of a construction which I have practically embodied, but it will be understood that I do not intend to limit my invention to the particular embodiment shown, further than as specified in the claims.

In the drawings 5 indicates a dynamo frame of suitable construction, illustrated as comprising a casting affording a closed casing, comprising a central ring 6, having formed therein in casting internal integral projections 7, constituting the poles or field core. The interior surfaces of these pole cores are made truly arcuate, as by proper machining, and around such cores are fitted the field windings 8, which are preferably previously wound and insulated detachable coils.

9 indicates in general the pole tube, which is preferably a soft steel tube, having a continuous uninterrupted interior surface, truly cylindrical throughout its entire length, and is generally of a thickness suitable for a pole shoe in proportion to the requirements of the machine. At suitable points, as 10, spaced to be positioned midway between contiguous pole core surfaces, the tube is attenuated throughout its entire length to extreme thinness, in a practical construction of a small dynamo approximately one and one half times the size indicated in the drawings, the pole tube has been reduced from a thickness of about one eighth of an inch to approximately three one thousandths of an inch. For effecting this attenuation I prefer that the exterior of the tube be dressed flat, as indicated in the drawings in Fig. 2, so that the attenuation may be gradual, as this formation is simple, easy to make and efficient. At one end, further, I prefer that the exterior of the tube should be dressed away somewhat to produce an exterior taper, as shown at 11. In assembling the parts the field coils 8 are placed upon the cores 7, and the pole tube, 9, has its tapered end 11 inserted between the cores 7 and is driven home, so that it projects longitudinally beyond the pole cores 7 at both ends, and effectually supports in position the field windings 8, the arrangement being as indicated in Fig. 2, such that the portions of extreme attenuation 10, stand half way between the poles 7 on opposite sides.

Obviously in a machine involving a greater number of poles an attenuation is provided in a pole ring midway between the approximate surfaces of each pair of adjoining poles.

12 indicates the armature, of any suitable form, arranged for rotation within the cylinder core of the pole tube, such armature being preferably constructed to have a very small clearance with respect to such interior surface of the pole tube, and being otherwise of any suitable arrangement. The construction and mounting of the armature 12, commutator 13 and other appropriate parts of the machine form no part of the present invention and need not be specifically described, as it will be understood that any suitable construction may be employed and that shown is illustrative only.

Having thus described my invention, what I claim and desire to secure by Letters Patent, of the United States, is:

1. In a dynamo electric machine, field pole cores, and a continuous connecting pole tube of paramagnetic material, attenuated between the pole cores.

2. In a dynamo electric machine, field pole cores, and a continuous connecting pole tube of para-magnetic material, attenuated in thickness between the pole cores, and presenting an uninterrupted, cylindrical interior surface.

3. In a dynamo electric machine, field pole cores and a continuous connecting tube of paramagnetic material, exteriorly flattened between the pole cores and at such flattened points attenuated to prevent short-circuiting of the pole core.

4. In a dynamo electric machine, field pole cores, and a connecting continuous pole tube of paramagnetic material, presenting interiorly a truly cylindrical unbroken surface, such tube exteriorly interfitting in self-sustaining relation with the pole cores, and being attenuated to extreme thinness between said pole cores.

5. In a dynamo electric machine, a field frame structure comprising a continuous field ring and inwardly projecting pole cores integral therewith, said pole cores being arcuate at their inner surfaces, field coils surrounding the cores, and a pole tube of paramagnetic material, interiorly cylindrical, interfitting snugly in said arcuate surfaces of the pole cores, for retention by said cores and to support the field windings upon said cores, the pole tube being attenuated to extreme thinness between the pole cores.

6. In a dynamo electric machine, pole cores, and a connecting independent pole tube of paramagnetic material of generally cylindrical form, attenuated to extreme thinness on straight lines parallel to the tube axis, between adjacent pole cores.

In testimony whereof I hereunto set my hand in the presence of two witnesses.

VINCENT G. APPLE.

In the presence of—
  E. M. GRIER,
  H. E. SNYDER.